US010857539B2

(12) United States Patent
Fiegen et al.

(10) Patent No.: US 10,857,539 B2
(45) Date of Patent: Dec. 8, 2020

(54) APPARATUS AND METHOD FOR VARIABLE SIZING OF PARTICULATES

(71) Applicant: General Mills, Inc., Minneapolis, MN (US)

(72) Inventors: Adam Fiegen, St. Louis Park, MN (US); David Ray Marks, Blaine, MN (US); Rodney McCalley, Carver, MN (US); Ralph A Stenvik, Plymouth, MN (US)

(73) Assignee: General Mills Inc., Minneapolis, MN (US)

( * ) Notice: Subject to any disclaimer, the term of this patent is extended or adjusted under 35 U.S.C. 154(b) by 198 days.

(21) Appl. No.: 16/163,122

(22) Filed: Oct. 17, 2018

(65) Prior Publication Data
US 2020/0122107 A1  Apr. 23, 2020

(51) Int. Cl.
| | |
|---|---|
| B02C 4/30 | (2006.01) |
| A23P 10/25 | (2016.01) |
| B01J 2/22 | (2006.01) |
| B28B 3/14 | (2006.01) |
| B28B 3/16 | (2006.01) |
| B30B 3/00 | (2006.01) |
| B30B 3/04 | (2006.01) |
| B30B 11/16 | (2006.01) |
| B02C 4/08 | (2006.01) |
| B30B 15/30 | (2006.01) |

(52) U.S. Cl.
CPC .............. *B02C 4/30* (2013.01); *A23P 10/25* (2016.08); *B01J 2/22* (2013.01); *B02C 4/08* (2013.01); *B02C 4/305* (2013.01); *B28B 3/14* (2013.01); *B28B 3/16* (2013.01); *B30B 3/005* (2013.01); *B30B 3/04* (2013.01); *B30B 11/165* (2013.01); *B30B 15/308* (2013.01)

(58) Field of Classification Search
CPC .. B02C 4/06; B02C 4/30; B02C 4/305; B02C 4/08; B30B 11/165
See application file for complete search history.

(56) References Cited

U.S. PATENT DOCUMENTS

| 50,712 | A | * | 10/1865 | Hugunin | ................. | D06F 83/00 |
| | | | | | | 492/51 |
| 2,404,159 | A | * | 7/1946 | Barber | ..................... | B41N 7/06 |
| | | | | | | 492/33 |
| 3,548,742 | A | * | 12/1970 | Wilhelm | ................. | B29B 7/564 |
| | | | | | | 100/95 |

(Continued)

FOREIGN PATENT DOCUMENTS

CA           1075658          4/1980

*Primary Examiner* — Faye Francis
(74) *Attorney, Agent, or Firm* — Diederiks & Whitelaw, PLC; Gregory P. Kaihoi, Esq.

(57) ABSTRACT

A particulate sizer includes an infeed for receiving a plurality of particulates, a first roller, and a second roller. The first and second rollers break down the plurality of particulates as the plurality of particulates passes through a gap between the first and second rollers. The width of the gap varies along a length of the first and second rollers. Accordingly, the first and second rollers compress some particulates to a first size and compress other particulates to a second smaller size. In addition, each of the first and second rollers has a textured outer surface for carrying the plurality of particulates through the gap.

20 Claims, 6 Drawing Sheets

(56) References Cited

U.S. PATENT DOCUMENTS

| | | | | |
|---|---|---|---|---|
| 3,633,831 | A * | 1/1972 | Dodson | B23D 31/008 |
| | | | | 241/61 |
| 3,862,721 | A * | 1/1975 | Flair | B02C 18/142 |
| | | | | 241/236 |
| 5,088,651 | A * | 2/1992 | Takahashi | B02C 4/32 |
| | | | | 241/30 |
| 5,203,513 | A * | 4/1993 | Keller | B02C 4/305 |
| | | | | 241/235 |
| 5,902,685 | A * | 5/1999 | Schroder | B02C 4/305 |
| | | | | 241/235 |
| 6,634,577 | B2 * | 10/2003 | Horigane | B02C 4/06 |
| | | | | 241/235 |
| 7,021,577 | B2 * | 4/2006 | Papajewski | B02C 4/08 |
| | | | | 241/236 |
| 7,159,809 | B1 * | 1/2007 | Cheng | B02C 4/08 |
| | | | | 241/101.2 |
| 2002/0074438 | A1 | 6/2002 | Horigane | |
| 2010/0032506 | A1 | 2/2010 | Patzelt | |
| 2014/0245799 | A1 * | 9/2014 | Kim | C05F 17/20 |
| | | | | 71/10 |
| 2016/0338401 | A1 * | 11/2016 | Shin | B02C 18/142 |
| 2018/0116117 | A1 * | 5/2018 | Lutz | A01D 82/02 |

\* cited by examiner

US 10,857,539 B2

APPARATUS AND METHOD FOR VARIABLE SIZING OF PARTICULATES

BACKGROUND OF THE INVENTION

The present invention pertains to the art of food production and, more particularly, to the sizing of particulates for use in food products.

Particulates, such as nuts, are often included as ingredients in the production of food products. Sometimes, the particulates are added whole, i.e., the particulates are not cut, crushed, or otherwise broken down. Other times, the particulates are broken down to a particular size. Although breaking particulates down to a particular size can help provide an end product with a consistent texture, this is not desired in all cases. Depending on the food product being produced, it might be desirable to have a range of particulate sizes so that the texture varies throughout the food product or between food products. This can make the food product seem homemade or more natural. Also, in certain cases, it may be desirable to have some larger particulate pieces in the product so that the consumer can see and feel the particulate but not have so many large pieces as to affect the cohesiveness of the product. Accordingly, the remaining particulate pieces would be smaller in size to still provide the desired flavor without affecting cohesiveness.

Currently, when it is desired to add particulates of different sizes to a food product, each size is produced separately, and the sizes are later combined prior to addition to the food product. This adds steps to the overall production process, and the use of multiple devices requires more floorspace within a production facility. In addition, such devices typically have metal parts that rotate at high speeds to cut or crush the particulates, requiring more energy and, in the case of blades, necessitating that a check for metal contamination be conducted. Accordingly, there is a need in the art for a way to produce particulates of different sizes without these downsides.

SUMMARY OF THE INVENTION

The present invention achieves the above goal through a particulate sizer including an infeed for receiving a plurality of particulates, a first roller, and a second roller. The first and second rollers operate in conjunction to break down the plurality of particulates as the plurality of particulates passes through a gap between the first and second rollers. The width of the gap varies along a length of the first and second rollers. Accordingly, the first and second rollers compress some particulates to a first size and compress other particulates to a second smaller size. Preferably, each of the first and second rollers has a textured outer surface for carrying the plurality of particulates through the gap.

This arrangement provides a way to produce particulates of different sizes in a single step and with a single device. In addition, the device does not have any parts that rotate at high speeds, reducing power consumption as well as the chance of contamination due to breakage of such parts.

Additional objects, features and advantages of the invention will become more readily apparent from the following detailed description of preferred embodiments thereof when taken in conjunction with the drawings wherein like reference numerals refer to common parts in the several views.

DETAILED DESCRIPTION OF THE INVENTION

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting but merely as a representative basis for teaching one skilled in the art to employ the present invention. In addition, any specific numerical value listed herein includes a margin of error of +/−5%. Accordingly, a diameter of 1.00 centimeters includes diameters between 0.95 and 1.05 centimeters. The term "about" increases the margin of error to 10%. For numerical values expressed as percentages, the margin of error refers to the base numerical value. In other words, "about 20%" means 18-22% and not 10-30%.

As discussed above, particulates are included in a wide variety of food products. Frequently, only particulates of a single size are used. However, in certain cases, there is a desire to use particulates of multiple sizes, which presents additional problems. For example, prior to the present invention, the nuts used in certain date-paste-based energy bars were sized in multiple batches, using different machinery, and then combined. In addition, the machines themselves had downsides due to their use of metal parts rotating at high speeds. The present invention was developed to improve the process of producing nuts of different sizes for use in these energy bars. However, the present invention can be used to size any particulate for any food product. For example, other common particulates include chocolate and cereal pieces.

Figure 1:
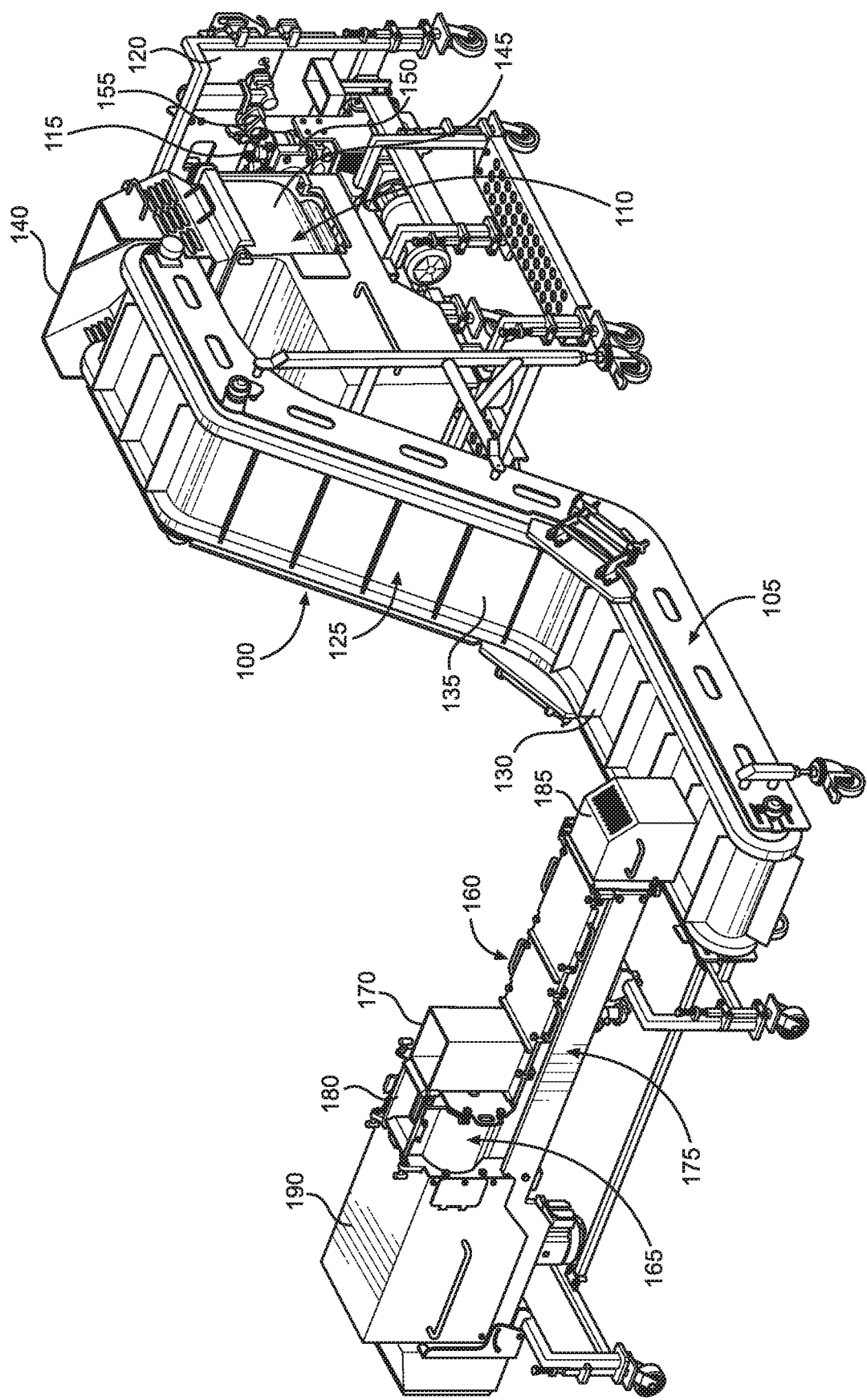
FIG. 1 is a perspective view of a portion of a food production line constructed in accordance with the present invention.

With reference to FIG. 1, a perspective view of a portion of a food production line constructed in accordance with the present invention is shown. The apparatus on the right (labeled 100) is described in detail in U.S. application Ser. No. 15/444,673, which is incorporated herein by reference. In general, apparatus 100 includes a conveyor 105, a pump feeder 110, a pump 115 and a cutter 120. Conveyor 105 is configured to transport edible material (not shown) to pump feeder 110. Conveyor 105 includes a belt 125 having a plurality of dividers 130 that define a plurality of bins 135. Bins 135 are configured to hold the edible material while belt 125 is rotated. As the edible material falls off belt 125, the edible material passes through a chute 140 and enters a hopper 145 of pump feeder 110. Pump feeder 110 mixes and compresses the edible material. The edible material then passes through an outlet region 150 of pump feeder 110 to enter pump 115. Pump 115 is configured to force the edible material through an extrusion die 155. As the edible material exits extrusion die 155, the edible material is cut into the desired shape by cutter 120. In one embodiment, cutter 120 is configured to cut the edible material into a plurality of bars.

Although apparatus 100 can be used to produce a variety of different food products, apparatus 100 is specifically designed to handle especially viscous materials. For example, the edible material discussed in connection with FIG. 1 can include a date paste, which has the consistency of a cold peanut butter. Particularly relevant in connection with the invention is the inclusion of particulates, such as nuts, dried fruit, chocolate or combinations thereof, which are added to the date paste. While such particulates are present on conveyor 105 along with the date paste, the particulates are not fully incorporated into the date paste at this point, i.e., only partial mixing has occurred prior to reaching conveyor 105 as will be detailed more fully below. Final mixing occurs within pump feeder 110, which is designed to fully incorporate the particulates within the date paste, specifically without further breaking down the particulates and without overworking the date paste. Overworking the date paste is undesirable since it causes the date paste to take on the consistency of taffy.

The apparatus on the left of FIG. 1 (labeled 160) receives and mixes the ingredients that make up the edible material and then deposits the edible material on conveyor 105. Apparatus 160 includes a particulate sizer 165, a fruit infeed 170 and a continuous mixer 175. Particulate sizer 165 is configured to receive particulates through a particulate infeed 180 and size the particulates. Specifically, particulate sizer 165 is configured to break down the particulates into multiple different sizes, as will be discussed below. Fruit infeed 170 is essentially a second particulate infeed and is configured to receive fruit or fruit-based particulates. Continuous mixer 175 receives the sized particulates from particulate sizer 165, the fruit particulates from fruit infeed 170, and a base material (e.g., date paste) from an inlet (located on the bottom of apparatus 160 but not visible in FIG. 1) and gently mixes these ingredients together using a twin-screw meshing-auger arrangement (not visible in FIG. 1) to form the edible material. The edible material is then deposited in bins 135 of conveyor 105 through a chute 185. Particulate sizer 165 and continuous mixer 175 are driven by at least one motor and transmission (not separately shown), which are located within a housing 190 of apparatus 160. In one embodiment, the sized particulates are nuts, and the fruit particulates are dried fruit. For example, the nuts can be almonds or cashews, and the dried fruit can be raisins, dates or the like.

Figure 2:
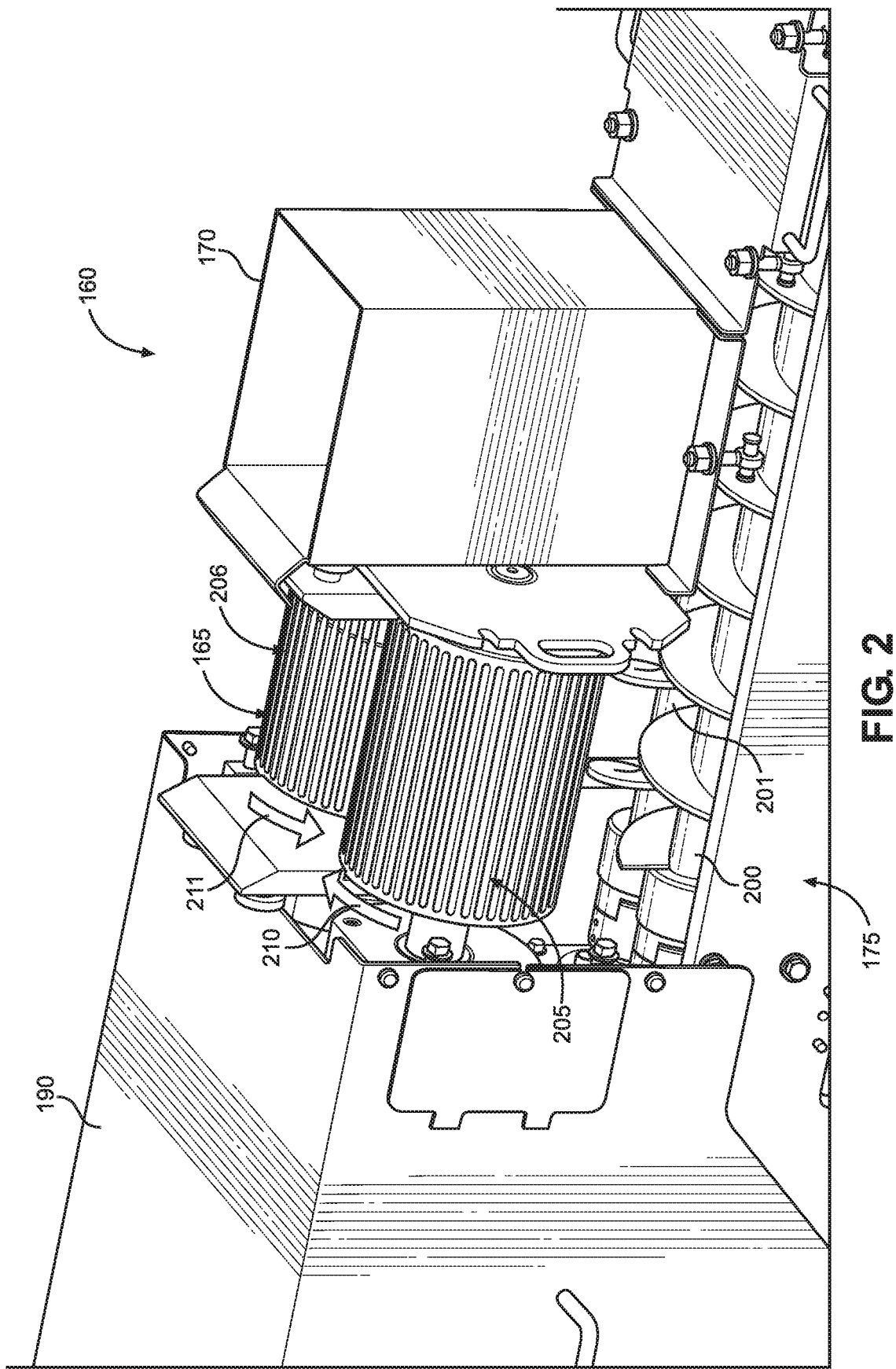
FIG. 2 is a perspective view of a particulate sizer of the food production line, with part of the housing removed to show two rollers.

With reference now to FIG. 2, apparatus 160 is shown with a portion of housing 190 removed so that the interior of particulate sizer 165 is visible. In addition, augers 200 and 201 of continuous mixer 175 can be seen. Particulate sizer 165 has a pair of rollers 205, 206, each of which has a textured outer surface (discussed in more detail below). Particulates that pass through particulate infeed 180 to enter particulate sizer 165 contact rollers 205 and 206, which are driven by the at least one motor and transmission. Particulate sizer 165 is configured such that each of rollers 205 and 206 rotates inward toward a center of particulate sizer 165. Specifically, roller 205 rotates in a direction 210, and roller 206 rotates in a direction 211. This rotation, in combination with the texture of rollers 205 and 206, causes the particulates to be carried downwards between rollers 205 and 206, after which the particulates fall into continuous mixer 175. Preferably, particulate sizer 165 is configured such that each of rollers 205 and 206 rotates at a low RPM.

Rollers 205 and 206 are configured to break down the particulates as the particulates pass between rollers 205 and 206. This is accomplished by positioning rollers 205 and 206 such that an appropriate, predetermined minimum gap exists between rollers 205 and 206. The specific positioning is dependent upon the size and brittleness of the incoming particulates, the desired size for the outgoing particulates, and the texture of rollers 205 and 206, particularly the interaction between the texture of roller 205 and the texture of roller 206. This is discussed in more detail below. However, it should at least be recognized at this stage that a gap of 2.0 centimeters between rollers 205 and 206, for example, would be insufficient to break down particulates with a diameter of 1.0 centimeters since such particulates would simply fall between rollers 205 and 206. In contrast, with a gap of 0.7 centimeters, the particulates would be compressed between rollers 205 and 206 as they are carried downwards, causing the particulates to shatter, chip, or otherwise break down.

Figure 3:
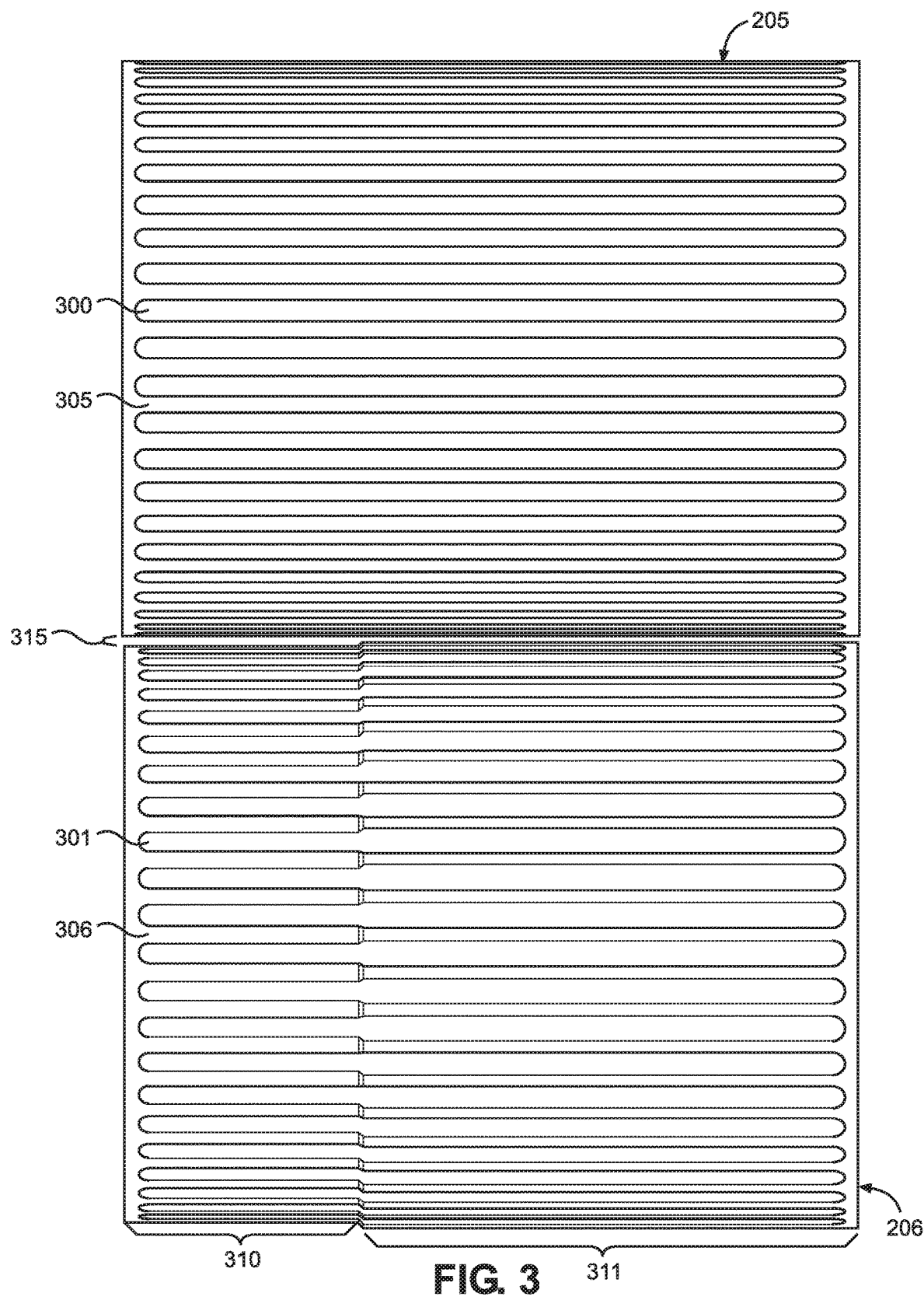
FIG. 3 is a top view of the two rollers.

Turning to FIG. 3, a top view of rollers 205 and 206 is provided. This view helps show the texture of rollers 205 and 206. In particular, roller 205 has a plurality of grooves 300 formed in an outer surface 305, while roller 206 has a plurality of grooves 301 formed in at outer surface 306. Roller 205 is shown to have a consistent, i.e., uniform, diameter along its length. In contrast, roller 206 has a first portion 310 with a relatively smaller diameter and a second portion 311 with a relatively larger diameter. Grooves 301 span both portions 310, 311. First portion 310 is spaced from second portion 311 along the length of roller 206, i.e., first portion 310 is spaced longitudinally from second portion 311. As a result, the width of a gap 315 between rollers 205 and 206 varies along the length of rollers 205 and 206. Specifically, gap 315 has a relatively larger width between first portion 310 and roller 205 and a relatively smaller width between second portion 311 and roller 205. Since the size of gap 315 affects how the particulates are broken down, this roller arrangement allows the particulates to be broken down into two different sizes using just two rollers in a single particulate sizer.

In the embodiment illustrated, first portion 310 makes up about 30% of the length of roller 206, and second portion 311 makes up about 70% of the length of roller 206. Accordingly, about 30% of the outgoing particulates will be of one size, and about 70% will be of another smaller size. However, it should be recognized that the relative lengths of first portion 310 and second portion 311 can vary depending on the desired mix of particulate sizes. It should also be recognized that rollers 205 and 206 can be configured to provide more than two particulate sizes by, for example, forming roller 206 with three portions, each with a different diameter.

In addition, roller 205 does not need to have a uniform diameter along its length. For example, roller 205 can mirror roller 206. That is, roller 205 can have a first portion, with a relatively smaller diameter, across from first portion 310 and a second portion, with a relatively larger diameter, across from second portion 311. In another variation, the first portion of roller 205 can make up about 70% of the length of roller 205 such that gap 315 has three different widths. Specifically, in this variation, the width of gap 315 is largest between the first portion of roller 205 and first portion 310, the width of gap 315 is smallest between the second portion of roller 205 and second portion 311, and the width of gap 315 is in between these sizes between the first portion of roller 205 and second portion 311. Certainly, combinations of these arrangements are also possible.

Based on the above, it should be understood that a wide variety of different roller arrangements can be constructed in accordance with the present invention. In general, the idea is to vary the gap between two rollers, along the length of the rollers, to break down incoming particulates into multiple sizes, with textured outer surface of the rollers serving to carry the particulates between the rollers. Accordingly, the rollers can have textures other than grooves. Broadly, each roller preferably has one or more raised portions and one or more indented portions on its outer surface. The different gap widths, as well as the relative lengths of these gap sections, are selected based on the particulate sizes, and size mixtures, desired. As such, many different values are appropriate for these variables depending on the application. In one embodiment, used to break down nuts, gap 315 is 0.318 centimeters (0.125 inches) wide between roller 205 and first portion 310, and gap 315 is 0.159 centimeters (0.0625 inches) wide between roller 205 and second portion 311.

Figure 4:
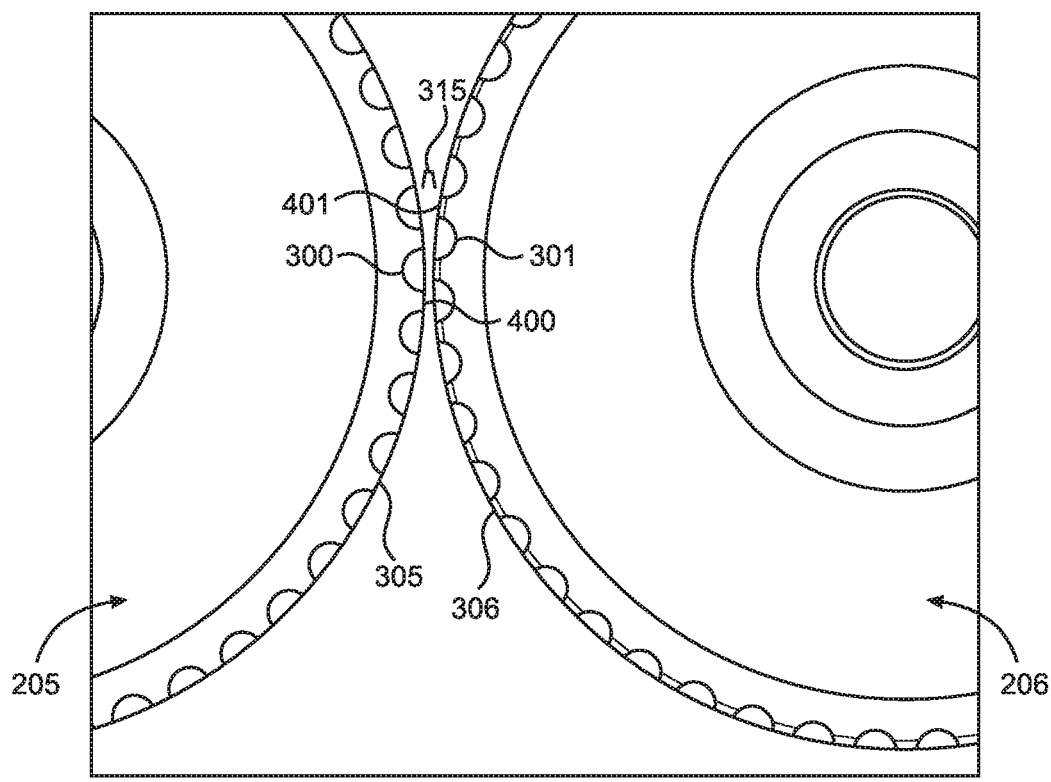
FIG. 4 is an end view of the two rollers in a land-to-groove arrangement.
Figure 5:
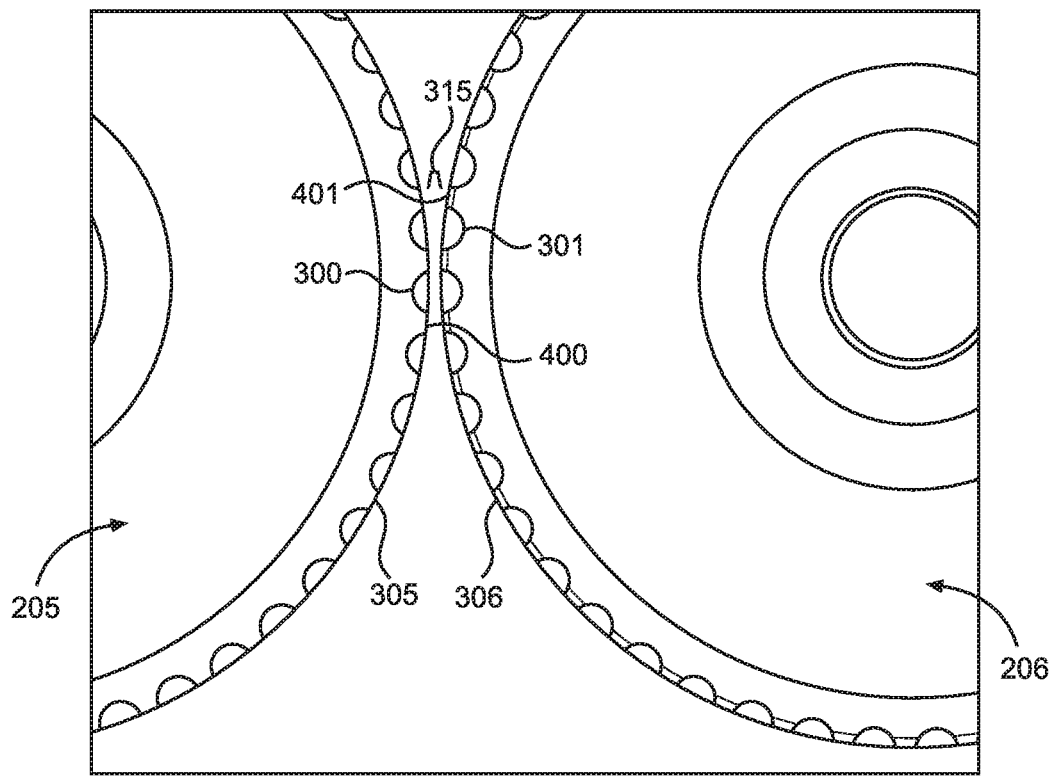
FIG. 5 is an end view of the two rollers in a land-to-land arrangement.

With reference now to FIGS. 4 and 5, two end views of rollers 205 and 206 are provided. As discussed above, roller 205 has grooves 300 formed in outer surface 305, while roller 206 has grooves 301 formed in outer surface 306. That is, grooves 300 and 301 extend inward from outer surfaces 305 and 306, respectively. As a result, a plurality of lands 400 is defined between grooves 300, and a plurality of lands 401 is defined between grooves 301, with the outer surfaces of lands 400 and 401 corresponding to outer surfaces 305 and 306, respectively.

As illustrated by FIG. 4, rollers 205 and 206 can be aligned such that, during rotation, lands 400 line up with grooves 301, and lands 401 line up with grooves 300. For purposes of the present invention, this arrangement is defined as a land-to-groove arrangement. Alternatively, as illustrated by FIG. 5, rollers 205 and 206 can be aligned such that, during rotation, lands 400 line up with lands 401, and grooves 300 line up with grooves 301. For purposes of the present invention, this arrangement is defined as a land-to-land (or groove-to-groove) arrangement.

Both land-to-groove and land-to-land roller arrangements can be used in accordance with the present invention. Notably, however, the effective gap between rollers 205 and 206 varies depending on the chosen arrangement (assuming a constant width for gap 315). For example, with a groove depth of 0.4 centimeters and a gap width of 0.2 centimeters at some longitudinal location along two rollers, the effective gap would be 0.6 centimeters in a land-to-groove arrangement and 1.0 centimeters in a land-to-land arrangement. The size of the effective gap affects how the particulates are broken down since the particulates are carried through gap 315 while in grooves 300 and 301. Accordingly, whether rollers 205 and 206 are in a land-to-groove or land-to-land arrangement should be considered when positioning rollers 205 and 206, i.e., when choosing the width of gap 315. As discussed above, other factors that should be considered include the size and brittleness of the incoming particulates, the desired size for the outgoing particulates, and the texture of rollers 205 and 206 (e.g., the height difference between the raised and indented portions).

Figure 6:
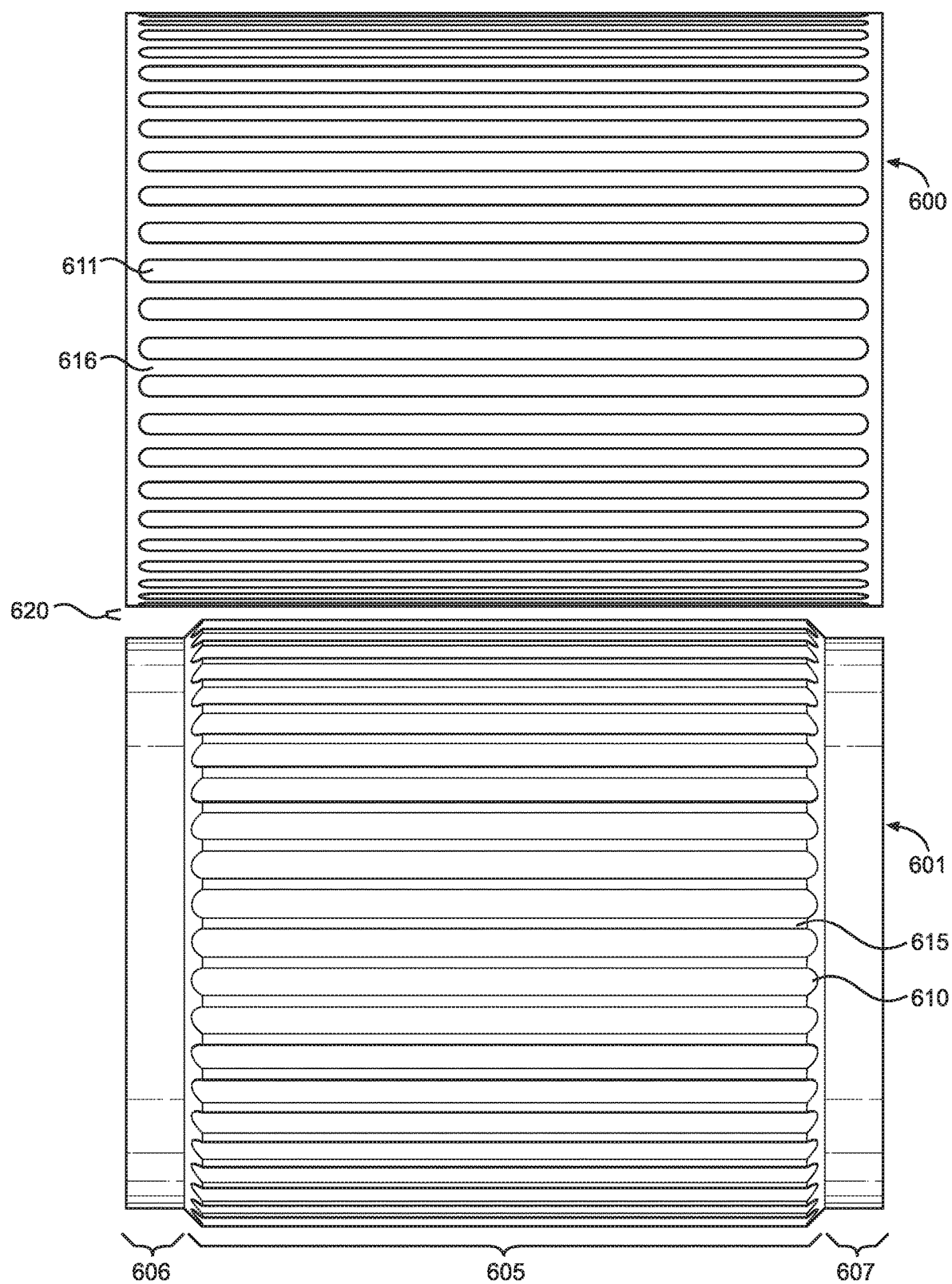
FIG. 6 is a top view of two rollers constructed in accordance with another embodiment of the present invention.

Turning to FIG. 6, a top view of two rollers constructed in accordance with another embodiment of the present invention is provided. Specifically, FIG. 6 shows a roller 600 and a roller 601. Rollers 600 and 601 function in the same manner as rollers 205 and 206. The only difference between these embodiments relates to the outer surface of roller 601. Rather than having two portions with different diameters and grooves spanning both portions, roller 601 has a first portion 605 with a relatively larger diameter, a second portion 606 with a relatively smaller diameter, and a third portion 607 with a diameter equal to that of second portion 606. Grooves 610 are formed in an outer surface 615 of roller 601 and span only first portion 605. Roller 600 is identical to roller 205. In particular, roller 600 has a plurality of grooves 611 formed in an outer surface 616 and a consistent diameter along its length.

The reason no grooves are provided on second and third portions 606, 607 is that a gap 620 between rollers 600 and 601 is sized such that particulates simply fall straight through these areas. That is, between second portion 606 and roller 601 and between third portion 607 and roller 601, the width of gap 620 is sufficient such that the incoming particulates can pass through without being compressed between rollers 600 and 601 and thereby broken down. Accordingly, the particulates do not need to be carried through these sections of gap 620 by grooves 610 or 611. It should therefore be recognized that roller 600 can be constructed in the same manner as roller 601, i.e., with no grooves at its ends. In such an embodiment, the diameter of the end portions of rollers 600 and 601 (e.g., portions 606 and 607) can be adjusted to provide the same gap as in the embodiment illustrated. In either case, it should be recognized that the width of gap 620 between portions 606 and 607 and roller 600 is chosen based upon the size of the incoming particulates. Likewise, the width of gap 620 between first portion 605 and roller 600 is chosen to break down the particulates into whatever size is desired, thereby providing both whole particulates and particulate pieces.

As with the embodiment of FIGS. 1-5, rollers 600 and 601 can be modified in various ways depending on the particulate size mixture desired. For example, first portion 605 of roller 601 can be divided into two grooved portions with diameters different both from one another and from portions 606 and 607. In other words, the embodiment of FIGS. 1-5 can be combined with the embodiment of FIG. 6. As such, it should be recognized that the modifications to the embodiment of FIGS. 1-5 discussed above can be applied to the embodiment of FIG. 6, e.g., rollers 600 and 601 can be angled relative to one another. In addition, the relative lengths and diameters of portions 605-607 can be varied.

Figure 7:
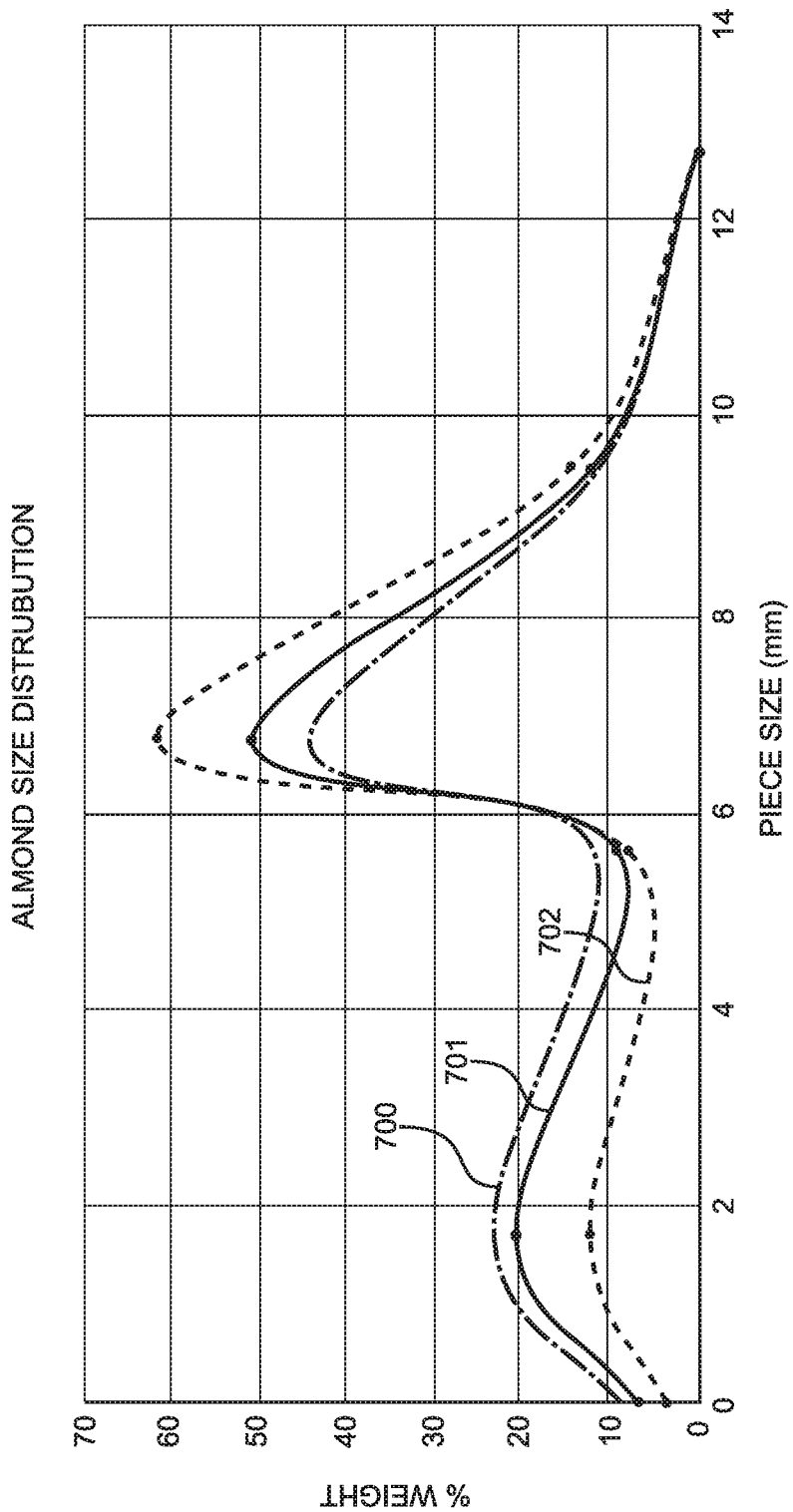
FIG. 7 is a graph of particulate size distributions generated using different particulate sizers constructed in accordance with the present invention.

Although the discussion above refers to breaking down particulates into two sizes, for example, the nature of the process and the particulates means that, in practice, the outgoing particulates will not be limited to only exactly two sizes. More accurately, the outgoing particulates will have some particulates that fall within one size distribution and other particulates that fall within another different size distribution. Or, stated differently, some particulates are being compressed to a first size, which causes the particulates to break down a certain way, and other particulates are being compressed to a second size (or not compressed at all), which causes the particulates to break down another way (or not break down). For example, with two rollers having a gap width of 0.2 centimeters at a first point, a gap width of 0.4 centimeters at a second point, and a groove depth of 0.4 centimeters, the effective gap would be 0.6 centimeters at the first point and 0.8 centimeters at the second point for a land-to-groove arrangement. As a result, some particulates are compressed to 0.6 centimeters and break down a first way into a first size distribution, while other particulates are compressed to 0.8 centimeters and break down a second way into a second size distribution. Overall, this provides a bimodal distribution of particulate sizes, as illustrated by FIG. 7, which shows the size distributions for almonds that were broken down using three different embodiments of the present invention. These distributions are labeled 700-702.

Of course, it should be recognized that other types of multimodal distributions can be produced with a particulate sizer of the present invention, e.g., a trimodal distribution.

Based on the above, it should be readily apparent that the present invention provides a way to produce particulates of different sizes in a single step and with a single device. In addition, the device does not have any parts that rotate at high speeds, reducing power consumption as well as the chance of contamination due to breakage of such parts. While certain preferred embodiments of the present invention have been set forth, it should be understood that various changes or modifications could be made without departing from the spirit of the present invention. For example, particulate sizers of the present invention can be used in other production settings. That is, the particulate sizers do not need to be used with apparatus 100 or even with the remainder of apparatus 160. Also, while certain particulates and food products have been discussed, the particulate sizers can be used with a variety of particulates for inclusion in many different food products. In general, the invention is only intended to be limited by the scope of the following claims.

The invention claimed is:

1. A particulate sizer comprising:
an infeed configured to receive a plurality of particulates;
a first roller; and
a second roller, wherein the first and second rollers are configured to break down at least some of the plurality of particulates to create at least first and second particulates from the plurality of particulates as the plurality of particulates passes through a gap between the first and second rollers, the first particulates having a first size distribution and the second particulates having a second size distribution distinct from the first size distribution, with a mode of the first size distribution being less than a mode of the second size distribution, and the first and second rollers are configured such that a width of the gap varies along a length of the first and second rollers.

2. The particulate sizer of claim 1, wherein the second roller has a first portion with a first diameter and a second portion with a second larger diameter, with the width of the gap between the first and second rollers being larger between the first portion and the first roller than between the second portion and the first roller, and the particulate sizer is configured such that the plurality of particulates contacts each of the first and second portions as the plurality of particulates passes through the gap.

3. The particulate sizer of claim 2, wherein the first roller has a consistent diameter along a length of the first roller.

4. The particulate sizer of claim 2, wherein the second roller has a textured outer surface configured to carry the plurality of particulates through the gap, and the textured outer surface spans both the first portion and the second portion.

5. The particulate sizer of claim 2, wherein the second roller has a textured outer surface configured to carry the plurality of particulates through the gap, and the textured outer surface spans only the second portion and wherein the first and second rollers are configured such that particulates that pass between the first portion and the first roller are not broken down and particulates that pass between the second portion and the first roller are broken down.

6. The particulate sizer of claim 1, wherein the first roller has a textured outer surface configured to carry the plurality of particulates through the gap.

7. The particulate sizer of claim 6, wherein the textured outer surface comprises one or more raised portions and one or more indented portions.

8. The particulate sizer of claim 6, wherein the textured outer surface comprises a plurality of grooves.

9. The particulate sizer of claim 1, wherein the first and second rollers are configured to create at least third particulates from the plurality of particulates, the third particulates having a third size distribution, with a mode of the third size distribution being greater than a mode of the second size distribution and are further configured to create only three or fewer size distributions.

10. A method of sizing a plurality of particulates with a particulate sizer including an infeed, a first roller and a second roller, the method comprising:
receiving the plurality of particulates with the infeed; and
breaking down the plurality of particulates with the first and second rollers as the plurality of particulates passes through a gap between the first and second rollers, with the first and second rollers being configured such that a width of the gap varies along a length of the first and second rollers; and
creating at least first and second particulates from the plurality of particulates, the first particulates having a first size distribution and the second particulates having a second size distribution distinct from the first size distribution, with a mode of the first size distribution being less than a mode of the second size distribution.

11. The method of claim 10, wherein breaking down the plurality of particulates includes compressing the plurality of particulates with the first and second rollers.

12. The method of claim 10, wherein the second roller has a first portion with a first diameter and a second portion with a second larger diameter, with the width of the gap between the first and second rollers being larger between the first portion and the first roller than between the second portion and the first roller, and breaking down the plurality of particulates includes causing the plurality of particulates to contact each of the first and second portions as the plurality of particulates passes through the gap.

13. The method of claim 12, wherein the first roller has a consistent diameter along a length of the first roller.

14. The method of claim 12, further comprising carrying the plurality of particulates through the gap with a textured outer surface of the second roller, wherein the textured outer surface spans both the first portion and the second portion.

15. The method of claim 12, further comprising carrying the plurality of particulates through the gap with a textured outer surface of the second roller, wherein the textured outer surface spans only the second portion.

16. The method of claim 15, wherein the first and second rollers are configured such that particulates that pass between the first portion and the first roller are not broken down and particulates that pass between the second portion and the first roller are broken down.

17. The method of claim 10, further comprising carrying the plurality of particulates through the gap with a textured outer surface of the first roller.

18. The method of claim 17, wherein carrying the plurality of particulates through the gap includes carrying the plurality of particulates through the gap with one or more raised portions and one or more indented portions.

19. The method of claim 17, wherein carrying the plurality of particulates through the gap includes carrying the plurality of particulates through the gap in a plurality of grooves.

20. The method of claim 17, further comprising creating third particulates from the plurality of particulates, the third particulates having a third size distribution distinct from the second size distribution, with a mode of the third size distribution being greater than a mode of the second size distribution and wherein only three or fewer size distributions are created.

\* \* \* \* \*